No. 840,396. PATENTED JAN. 1, 1907.
R. R. SUTER.
SPRING HINGE ATTACHMENT FOR SCREEN DOORS.
APPLICATION FILED JULY 9, 1906.
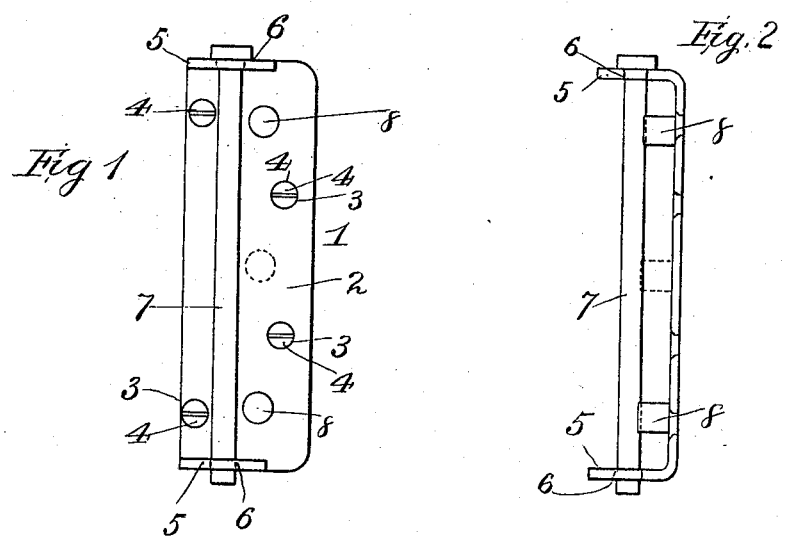
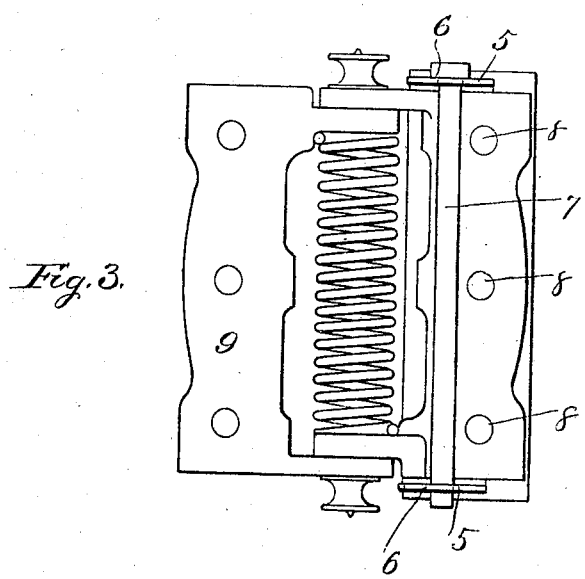
Witnesses:
S. S. Burket.
H. T. McKeen.
Inventor:
Robert R. Suter,
By Hun Bagga & Co.
Attorneys

UNITED STATES PATENT OFFICE.

ROBERT R. SUTER, OF MEDIA, PENNSYLVANIA.

SPRING-HINGE ATTACHMENT FOR SCREEN-DOORS.

No. 840,396.　　　　Specification of Letters Patent.　　　　Patented Jan. 1, 1907.

Application filed July 9, 1906. Serial No. 325,353.

*To all whom it may concern:*

Be it known that I, ROBERT R. SUTER, a citizen of the United States, residing at Media, in the county of Delaware and State of Pennsylvania, have invented certain new and useful Improvements in Spring-Hinge Attachments for Screen-Doors, of which the following is a specification.

My invention pertains to improvements in door-hangers, particularly for screen-doors. Its object is to provide for readily placing in position of the door when needed for use without the employment of screws, or like fastenings, for its retention and to effect that end in a simple, effective, and expeditious manner.

Said invention consists of certain structural features or instrumentalities substantially as hereinafter fully disclosed, and specifically pointed out by the claims.

In the accompanying drawings, illustrating the preferred embodiment of my invention, Figure 1 is a side elevation thereof. Fig. 2 is a view in edge elevation of the same or at right angles to the view-point of Fig. 1. Fig. 3 is a view in side elevation of the part shown in the aforesaid figures, applied in connection with an ordinary or approved form of hinge for hanging or placing in position a screen-door, although the latter is not disclosed.

In carrying out my invention I suitably cast in structural outline what may be termed a "bracket" or "hanger" 1, which is principally of plate-like dimensions, having its plate or vertical portion 2 provided with orifices or openings 3 for receiving screws 4 or like fastenings for attaching the same to the door-jamb and upon which it is designed to remain as a fixture. Said bracket or hanger has its end outturned or right-angled portions 5 also provided with registering apertures or orifices 6 to receive, and through which is passed a headed pin or retaining device 7 common to both of said orifices, the purpose of which will presently appear. Said bracket or hanger has its plate portion 2 provided or equipped at requisite intervals apart with short studs or projections 8, preferably cylindric and effective, for engagement with certain of the holes or apertures in a wing or leaf of a hinge 9, shown as a spring butt-hinge, although the hinge as such, or its particular type, forms no part of the claimed subject-matter herein, it being employed simply by way of illustrating the practical application of my invention.

It is noted that the hanger or bracket 1, presumably in position as a fixture upon the door-jamb, as above stated, and the pin or retaining device 7 being withdrawn, which hanger or bracket is duplicated in its application to the door-jamb, as will be readily appreciated, the hanging of the door—a screen-door, for instance—is effected by placing the requisite hinge-leaves flat against the plate portion 2 of each bracket with certain of its usual screw-receiving orifices in registration or coincidence with and so as to receive the studs or projections 8 of said brackets upon which said hinge-leaves are inserted, and then replacing the pin 7 of each hanger or bracket, the same passing down in front of and in contact with said hinge-leaves, thus providing for securing said hinges, together with the door, in effective or working position upon the door-jamb by means of said brackets or hangers. Also it is obvious that by means of this arrangement the parts may be as readily disassembled and the door be displaced or removed when no longer required for use.

I claim—

1. A door-hanger or bracket having studs effective for engagement with the ordinary screw-receiving openings in the door-hinge, and additional means combining with said studs, for the retention of the door in working position.

2. A door-hanger or bracket equipped with means effective for engagement with the ordinary screw-receiving openings in the door-hinge, and with apertured right-angled end portions and a pin or bolt insertible through the apertures of said right-angled end portions.

In testimony whereof I have signed my name to this specification in the presence of two subscribing witnesses.

ROBERT R. SUTER.

Witnesses:
　WM. H. WOOD,
　WM. R. T. KOLP.